Sept. 29, 1970    F. HOM    3,531,049
UNITARY EJECTOR-THRUST REVERSER ASSEMBLY
FOR JET-PROPULSION ENGINES
Filed Dec. 20, 1968    2 Sheets-Sheet 1

INVENTOR.
FELIX HOM
BY *George E. Pearson*
ATTORNEY

United States Patent Office 3,531,049
Patented Sept. 29, 1970

3,531,049
UNITARY EJECTOR-THRUST REVERSER ASSEMBLY FOR JET-PROPULSION ENGINES
Felix Hom, La Mesa, Calif., assignor to Rohr Corporation, Chula Vista, Calif., a corporation of California
Filed Dec. 20, 1968, Ser. No. 785,525
Int. Cl. B64c *15/04*
U.S. Cl. 239—265.29    11 Claims

ABSTRACT OF THE DISCLOSURE

A unitary combination ejector-thrust reverser structure for jet engines is disclosed. The combination includes thrust-reversing blocker doors, which when in a stowed position form a portion of the ejector barrel, and a compact low-friction bogie-type actuating mechanism for moving the doors into a deployed position. The doors are provided with fixed end plates to improve their deflection of the gaseous discharge from the engine when the doors are in their deployed condition. A unique arrangement permits the doors to be stowed without the end plates interfering with flow through the ejector barrel.

BACKGROUND OF THE INVENTION

This invention relates to thrust reversers for jet propulsion engines and more particularly to a combination thrust reverser and ejector for such engines.

It is well known in the prior art to provide means associated with the thrust-producing portions of jet engines for controlling or deflecting such thrust to produce a negative or reverse thrust. Such reverse thrust is useful, typically, to reduce the landing roll of aircraft to which the engines might be attached.

It is also well known to provide a jet engine with an ejector at its tail which draws cooling air over the engine and into the ejector barrel where it mixes with the primary exhaust thereby increasing exhaust mass flow. An increase in mass flow is accompanied by a resultant increase in thrust.

It is desirable, in the reverser and ejector arts to make such devices readily accessible for inspection and service purposes and to make them as simple and compact as possible. The devices furthermore must be capable of withstanding very high temperatures and mechanical stresses.

Accordingly a simple yet durable structure which can function as a thrust reverser, sound suppressor, and ejector is desirable in the art.

SUMMARY OF THE INVENTION

An object of this invention therefor is to provide a simple combination thrust reverser, sound suppressor, and ejector for jet engines.

A further object of this invention is to provide a simple combination thrust reverser and ejector which is capable of high degrees of reverse thrust.

A more particular object of this invention is to provide a unique combination thrust reverser and ejector assembly wherein the reverser doors are provided with fixed end plates for improved thrust reversal.

Another object is to provide a combination reverser, suppressor, and ejector as aforementioned in which the reverser doors may be cracked open to produce a noise reduction effect.

The above objects and features are achieved, in accordance with this invention, by providing a combination thrust reverser and ejector having an ejector barrel of substantially cylindrical configuration. The barrel includes a plurality of reverser blocker doors coextensive therewith when in their stowed position.

Each of the blocker doors is pivotally attached to the ejector barrel and each is arranged to pivot about a respective axis through the barrel. Each door is provided with a rigid end plate on its upstream end. The end plate extends in a direction normal to the door surface and functions to further deflect exhaust flow in an upstream direction from the engine tailpipe when the doors are deployed and operating as reversers.

Means are also included between the engine and reverser for receiving and stowing the door end plates when the doors are stowed. This latter means also forms a smooth channel with the engine tailpipe for passage of engine cooling air to the ejector barrel.

By pivoting the doors into the barrel interior, exhaust flow is blocked and deflected over the end plates and in an upstream reverse-thrust direction.

By cracking the reverser doors open slightly ambient air is drawn into the ejector barrel to mix with the cooling air and exhause gases to thus produce a noise reduction effect.

The above objects and features will be better understood from the ensueing detailed description and claims considered in conjunction with the attached drawings wherein:

DETAILED DESCRIPTION

Before making reference to the drawings it should be noted at this point that like numerals have been used throughout the drawings and description to indicate like elements.

Figure 1:
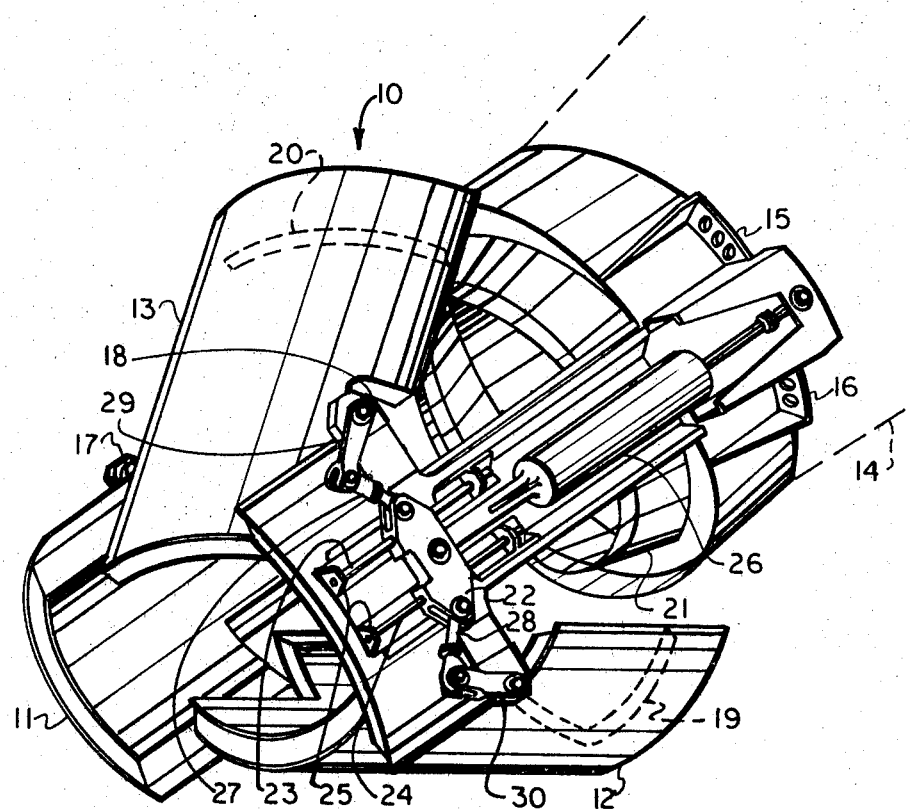
FIG. 1 is a pictorial overall view of one embodiment of this invention.

Referring now to FIG. 1, the reverser-ejector assembly generally indicated by the numeral 10 comprises a substantially cylindrical ejector barrel 11 having at least two coextensive thrust-reversing blocker doors 12 and 13. In FIG. 1 the doors are shown positioned essentially midway between their stowed and deployed limits, as will be better understood from this detailed description. The doors 12 and 13, when stowed, smoothly fill mated cutouts in the barrel 11 to form a closed and aerodynamically clean cylinder. The barrel 11 is attached at its upstream end to the downstream or tailpipe end of a jet propulsion engine, partially shown in phantom and designated by numeral 14. Attachment could be by means of brackets such as 15 and 16 or any other suitable rigid means. Such details are dependent on the particular engine on which the reverser-ejector is to be attached and do not form a part of the instant invention per se. It might be noted that the forward, or upstream, end of the ejector barrel structure should be so shaped as to mate with the nacelle of engine 14 in an aerodynamically streamlined manner. Suitable fairings could be used to achieve this latter condition.

Each blocker door is pivotally attached to ejector barrel 11 by suitable shaft and bearing assemblies such as at 17 and 18. Details of the pivot arrangement are better shown in FIG. 3 and will be described in relation thereto at a later point.

It should be noted at this point that although the embodiment shown in the drawings has two blocker doors, other numbers of doors may also be used. For example, a three door embodiment could be constructed in a similar manner to that used to construct the version of FIG. 1.

A key feature of the combination of this invention resides in the provision of rigid end plates 19 and 20, respectively, near the upstream end of each blocker door. Each end plate extends in a direction substantially normal to the interior surface of each door and is rigidly affixed thereto as may be better noted in FIG. 4. The purpose of the end plates 19 and 20 is to further deflect, in an upstream direction, the exhaust flow passing along the blocker door surfaces when the reverser is in its deployed condition. Without the end plates, the blocker doors deflect the exhaust with a resultant thrust in the reverser, or upstream, direction as long as the included angle between the deployed doors is less than 180°. The magnitude of the reverse component, however, may be insufficient for a desired operation. By using the end plates, a marked increase in the reverser component may be achieved. The attachment of end plates to the doors normally prevents reversers from being used as ejector barrels since the plates tend to interfere with flow through the barrel when the doors are stowed.

A unique structural arrangement of this invention obviates the latter problem and essentially comprises tapered member 21 extending substantially between the tailpipe area of the engine 14 and the ejector barrel 11. The member 21 has a diameter larger than the tailpipe at its end adjacent thereto so that engine cooling air, ejector air, is free to pass through the channel formed between the tailpipe and member 21. At its opposite end, member 21 has a diameter substantially equal to the distance between the edges of the opposite end plates. Details of the structure will be better understood in connection with the description of FIG. 4 to follow.

In the preferred embodiment, a bogie-type drive mechanism is used for actuating the blocker doors. The mechanism includes a bogie or follower 22 slidably supported on a pair of rigid rod members 23 and 24. Rods 23 and 24 are attached at their ends in spaced relationship to the outer skin of barrel 11 by brackets such as at 25. An actuator 26, of any suitable type, extends in a direction parallel to rods 23 and 24 and is arranged to exert a translational motion to the follower or bogie 22 between its two directional extremes. Details of the bogie-type drive mechanism are shown in co-pending application for U.S. patent, Ser. No. 681,790 entitled "Improved Jet Reverser Drive System" filed Nov. 9, 1967 by Felix Hom and Dale W. R. Lawson and assigned to a common assignee.

The translational motion of the bogie drive is transferred to each of the blocker doors through rigid links 27 and 28 and cranks 29 and 30 respectively. Each crank is rigidly secured to its associated door in such a manner that rotation of the crank causes the door to pivot about its axis. Further details of the linkage between the bogie and door will be described in connection with FIGS. 3 and 4 to follow.

Figure 2:
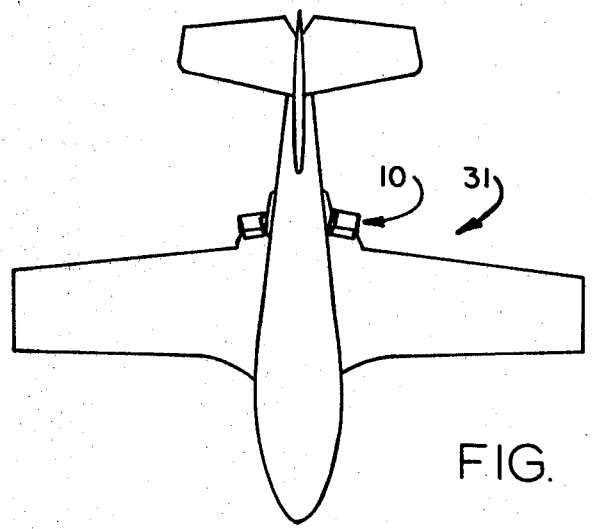
FIG. 2 is a top view of a typical airplane to which a pair of the reverser-ejectors of FIG. 1 have been attached.

Referring now to FIG. 2, a typical airplane of a type having two jet propulsion engines is shown and generally designated by the numeral 31. Two reverser-ejectors such as 10 are hence installed on the engines. It should of course be understood that the combination of this invention is equally applicable to those aircraft using a single jet engine or any plurality thereof. The engines are not visible on the airplane 31 since they are enclosed between the wing and fuselage. The general type of environment for which the instant invention is intended to be used, should be understood from the example of FIG. 2.

Figure 3:
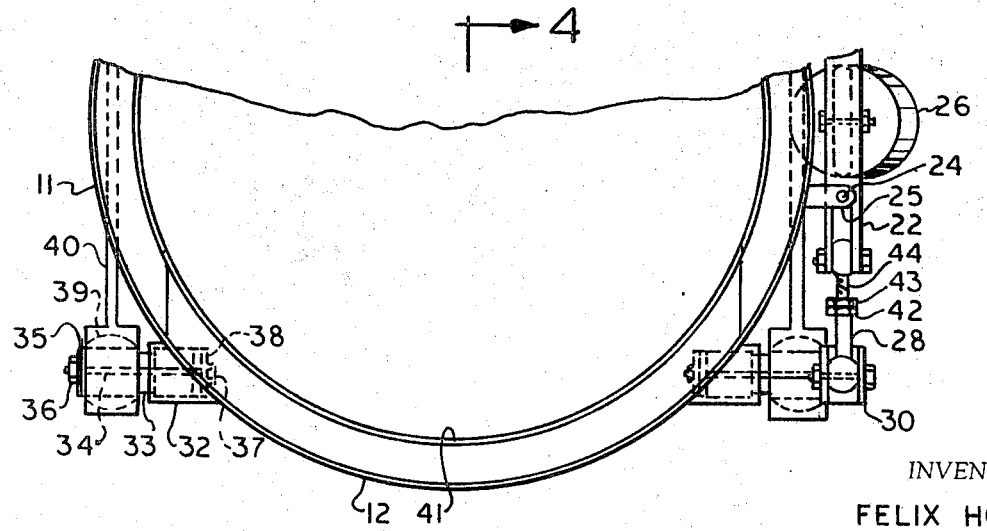
FIG. 3 is a fragmentary end view of the lower half of the embodiment of FIG. 1.

FIG. 3, an end view looking upstream at the barrel end with the blocker doors closed shows the pivot and actuating mechanism for the doors in detail. FIG. 3 only depicts the lower half of the assembly but it should be understood that the upper portion is substantially the same. To simplify the figure, details within the barrel, e.g., the engine tailpipe, etc. have been omitted.

Referring now to FIG. 3, the pivot structure at each pivot should be considered. On opposite sides of each door a pivot mounting assembly such as 32 is provided. Assembly 32 includes an outwardly extending axle-like pivot shaft 33 which is rigidly secured to the door 12 by means of a retaining bot 34, washer 35 and nut 36. The head 37 of bolt 34 abutts mounting plate 38 which is secured to the door 12. The shaft 33 is rotatably received in a spherical bearing 39 which in turn is received by the widened end of bearing mounting bracket 40. Mounting bracket 40 is secured to the side of ejector barrel 11 by any suitable means. A spherical bearing is used to support the shaft 33 since it permits movement in directions other than pure rotation. Because of the extreme temperature cycles that the blocker doors are subjected to with their associated expansion and the like, shaft 33 may not always maintain a perfect alignment with its bearing and consequently the spherical bearing permits free rotation even when the shaft is distorted from its normal axis. This unique arrangement of the blocker door pivots results in the reverser-ejector of this invention being substantially more durable than those of the prior art. Although only a single pivot assembly has been described in detail it should be understood that each of the remaining pivots is constructed in the same manner. It should also be understood that the pair of pivots on each door are aligned along a common single axis through the door.

It may be noted from FIG. 3 that the ejector barrel and the blocker doors each have a smooth unobstructed inner surface 41. The smooth inner surface 41 permits the combination of this invention to operate efficiently as an ejector.

Figure 4:
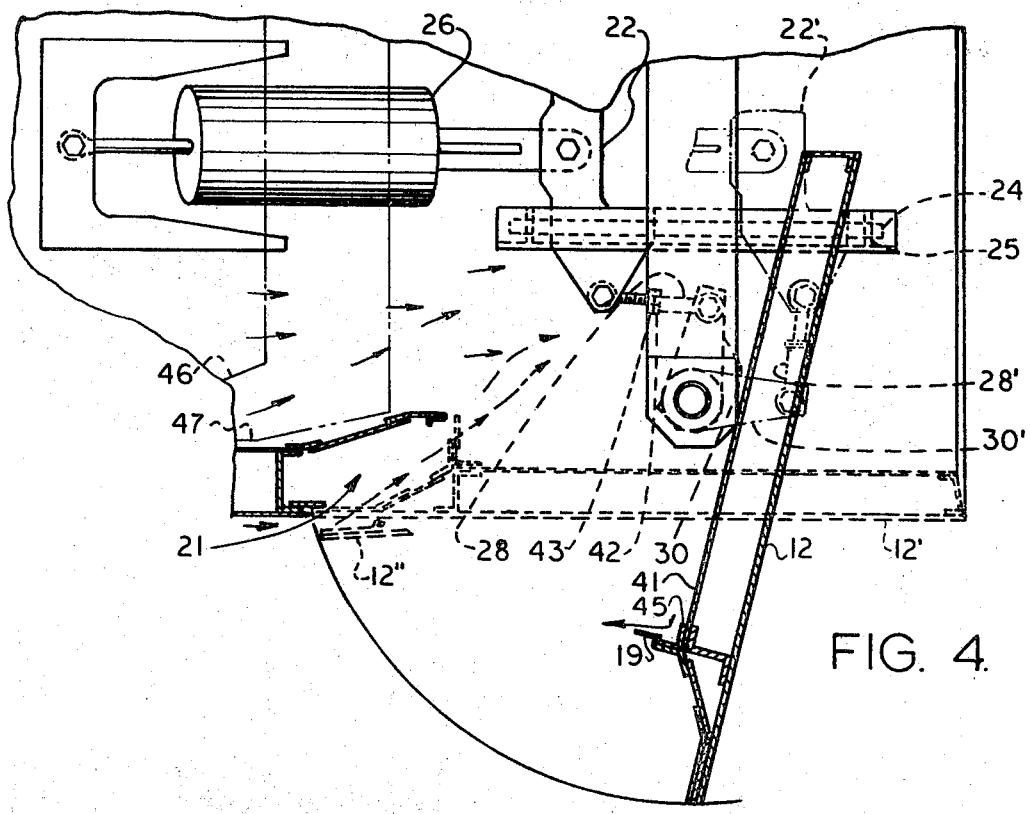
FIG. 4 is a fragmentary and somewhat schematic view taken along line 4—4 of FIG. 3 and showing the details of the blocker door structure and actuating mechanism.

Referring now to FIG. 4, the manner in which the instant invention operates can be best understood. The arrangement of the blocker door and the related linkages in the stowed position is shown by the dashed lines in the figure. The elements in dashed lines have been numbered, where appropriate, by their same numerals with the exception of a prime (') thereafter, and with the further exception of the dashed line door position designated 12".

Considering the arrangement of the blocker door and its linkages in the stowed position the sequence of operations to deploy same can be readily noted. By selectively energizing activator 26, bogie or follower 22 is caused to slide along rods 23 and 24. Linkage 28 transfers the translational movement of the bogie 22 to crank 30 which thereby rotates causing door 12 to pivot. When the bogie 22 reaches the limit of its travel, door 12 is fully deployed in its reverser mode. The reverse of this sequence takes place when the door is to be returned to its stowed position. The actuating linkage may be stopped at any point between its extremes to permit the doors to function as thrust control devices. Also, as depicted in the position designated 12", the doors may be cracked open slightly to the order of 4° to thus move ambient air into the ejector barrel to effect sound suppression, as aforenoted.

It can be noted from FIGS. 3 and 4 that link 28 is provided with a means to adjust its length to any fixed dimension within limits. This means comprises the two nuts 42 and 43 and threaded 44. One of the nuts 42, 43 serves as a locking member. The length of link 28 is adjusted with the blocker doors stowed in such a manner that the doors tend to be forced or biased shut with crank 30 being forced into an "over center" condition.

In FIG. 4, the construction of the rigid and fixed end plates can be best seen. The end plate designated by the numeral 19 is securely attached to the inner surface of door 12 by an angle member 45. As can be noted, the plate 19 extends at substantially a right angle to the door 12. Its particular height above the door can be varied depending on the particular jet engine on which the device is to be used.

In FIG. 4, the general profile of the tailpipe of a jet engine is shown in phantom and indicated by numeral 46. Also similarly shown is the outer cowling or ejector tube 47. Between members 46 and 47 engine cooling air normally flows. As previously discussed, for this invention to operate efficiently, the flow of such air into the ejector barrel 11 must not be interrupted. Therefore, the tapered member generally designated by 21, and comprised of suitable sheet metal and reinforcements, extends between the tailpipe area and the barrel. The member 21 permits the end plate 19 to be stowed without abruptly interfering with ejector flow as can readily be understood from the figure.

As can be seen in FIG. 4, the diameter of the downstream end of member 21 is chosen to be substantially equal to the distance between opposite end plate edges to ensure thorough stowing of such end plate edges.

It might be noted that single actuator, placed on one side of the ejector barrel has been found adequate for most applications. The use of two or more such activators might be necessary in certain situations and same is within the scope of this invention.

It should further be noted that although the particular materials used in constructing the embodiment of this invention have not been detailed, it should be understood that suitable aircraft materials such as honeycomb structures, etc. could be used, where desired.

It should be understood therefore that in accordance with this invention a simple and unique combination thrust reverser, sound suppressor, and ejector assembly wherein the blocker doors have been provided with fixed end plates has been disclosed.

Although this invention has been described with regard to a particular embodiment thereof it should not be limited thereto for various changes and modifications could be made by one having ordinary skill in the art without departing from the spirit and scope of the invention as defined in the following claims.

What is claimed is:
1. A combination ejector-thrust reverser apparatus for attachment to the tail pipe end of a jet propulsion engine, comprising;
   an ejector barrel of substantially cylindrical configuration and including a plurality of blocker doors coextensive therewith when in their stowed positions,
   each of said blocker doors being pivotally attached to said ejector barrel and each being arranged to pivot about a respective axis through said barrel,
   each of said blocker doors being provided with a rigid end plate on its upstream end,
   said end plate extending in a direction normal to the door for further deflecting flow from said tailpipe when said doors are in their deployed position,
   means for receiving and stowing said end plates when said doors are stowed and forming with said tailpipe a channel therebetween for passage of engine cooling air to the ejector barrel,
   whereby pivoting of said doors into the barrel interior causes said doors to block and deflect any gaseous discharge in said barrel and direct said discharge over said end plates and in a reverse-thrust direction.
2. The apparatus of claim 1 wherein the included angle between said doors, when same are pivoted into said barrel, is less than 180°.
3. The apparatus of claim 1 further including:
   means for selectively pivoting said doors about their respective axes.
4. The apparatus of claim 1 wherein said means for receiving and stowing said end plates includes a tapered member extending between said engine tailpipe and said ejector barrel and having a diameter larger than that of said tailpipe at its end adjacent thereto and a diameter substantially equal to the distance between opposite blocker door end plates at its end adjacent said barrel.
5. The apparatus of claim 1 wherein said blocker doors are pivotally attached to said ejector barrel by means of a plurality of spherical bearings;
   each of said blocker doors being supported by two of said spherical bearings,
   said bearings being coaxial to said respective pivot axes of said doors.
6. The ejector-thrust reverser of claim 1 wherein said end plates are shaped to conform to the exterior of said blocker doors;
   whereby said end plates are flush with the ejector barrel exterior when said doors are in their stowed position.
7. The ejector-thrust reverser of claim 3 wherein said means for selectively pivoting said doors about their axes comprises;
   at least one rigid rod member mounted along one side of said ejector barrel and at right angles to said pivotal axes of said blocker doors,
   a follower member slidably supported on said rigid rod,
   means for selectively sliding said follower along said rod,
   said follower having a pair of rigid links pivotally secured to opposite respective ends thereof,
   a pair of rigid linking members each having one of its ends pivotally secured to an opposite respective end of said follower member,
   a pair of cranks attached to respective ones of said blocker doors,
   the other ends of said rigid linking members being pivotally secured to respective ones of said cranks,
   whereby sliding said follower along said rod causes said linking members to rotate said cranks thereby to actuate said blocker doors.
8. The ejector-thrust reverser of claim 7 wherein said means for selectively pivoting includes two rigid rod members;
   said rods being parallel to each other,
   said follower being slidably supported along both of said rods.
9. The ejector-thrust reverser of claim 8 wherein said rigid linking members are provided with means for adjusting their respective lengths,
   whereby said lengths can be adjusted to cause said blocker doors to be securely biased in their stowed position.
10. The ejector-thrust reverser of claim 8 wherein said means for selectively sliding said follower along said rods comprises;
    a hydraulic actuator extending in a line parallel to said rods and wholly contained within the ejector-thrust reverser assembly,
    said actuator being arranged to exert a translational motion to said follower member along a line parallel to said rods,
    whereby translation by said actuator to a first directional extreme causes said blocker doors to assume a stowed position and translation to an opposite directional extreme to said first causes said blocker doors to assume a deployed or thrust-reversing position.
11. The ejector-thrust reverser of claim 10 wherein said actuator may be stopped in any selected position between said two directional extremes,
    whereby said blocker doors may be positioned to give a selected degree of thrust control or sound suppression.

References Cited

UNITED STATES PATENTS

| 2,753,684 | 7/1956 | Greene | 239—265.29 |
| 3,020,712 | 2/1962 | Dolliver | 239—265.29 |
| 3,164,956 | 1/1965 | Colebrook et al. | 239—265.29 X |
| 3,280,561 | 10/1966 | Kutney | 60—230 X |

LLOYD L. KING, Primary Examiner

T. C. CULP, JR., Assistant Examiner

U.S. Cl. X.R.

60—229; 239—265.13, 265.39